United States Patent [19]

Kubota et al.

[11] Patent Number: 4,610,338

[45] Date of Patent: Sep. 9, 1986

[54] BRAKE DEVICE FOR CONTROLLING BRAKE OPERATION ON INCLINES

[75] Inventors: Hitoshi Kubota, Minamiashigara; Tadaaki Otokuni, Tokyo; Shoji Suzuki; Keiji Nakagawa, both of Yokosuka, all of Japan

[73] Assignees: Nissan Motor Co., Ltd., Yokohama; Nippon Air Brake Co., Ltd., Kobe, both of Japan

[21] Appl. No.: 630,276

[22] Filed: Jul. 12, 1984

[30] Foreign Application Priority Data

Jul. 14, 1983 [JP] Japan ................................ 58-128342

[51] Int. Cl.$^4$ ............................................ B60K 41/24
[52] U.S. Cl. .................................... 192/13 A; 192/4 A
[58] Field of Search ................ 192/3 H, 13 A, 30 W, 192/4 A; 137/598

[56] References Cited

U.S. PATENT DOCUMENTS 2,113,915  4/1938  Freeman ..................... 192/13 A X
2,251,787  8/1941  Gardiner .................... 192/13 A X
2,502,118  3/1950  Ashton et al. ................... 192/3 H

FOREIGN PATENT DOCUMENTS 56-34550  4/1981  Japan .
58-4654   1/1983  Japan .

Primary Examiner—Rodney H. Bonck
Assistant Examiner—Richard M. Lorence
Attorney, Agent, or Firm—Schwartz, Jeffery, Schwaab, Mack, Blumenthal & Evans

[57] ABSTRACT

Disclosed is a brake device constructed to supply a pressure fluid from a pressure source to brake actuating devices of the wheels of a vehicle. The brake device includes a brake retainer valve which has a valve element arranged in a valve chamber and a valve seat on which the valve element is seated and unseated. In the brake device, when on an upward slope the brake pedal and the clutch pedal are depressed. Sequentially, the pressure fluid is not released from the brake actuating devices to the pressure source by seating the valve element on the valve seat in spite of returning the brake pedal, and the pressure fluid is released by removal of the valve element from the valve seat by returning the clutch pedal. In the brake retainer valve, a solenoid is provided, which is connected to the device for detecting the backward driving of the vehicle to prevent seating of the valve element on the valve seat by attracting the valve element away from the valve seat.

10 Claims, 3 Drawing Figures

BRAKE DEVICE FOR CONTROLLING BRAKE OPERATION ON INCLINES

BACKGROUND OF THE INVENTION

1. Field of the Invention

The present invention relates to a fluid operated, brake device for use in a vehicle having a valve device for facilitating initial backward movement of the vehicle from a halt on an upward slope, and more particularly, to a brake device provided with a brake actuating mechanism which is operated during backward moving of a vehicle on an upward slope.

2. Description of the Prior Art

As a prior art fluid operated brake device for facilitating the starting operation for re-starting a vehicle after a stop on an upward slope, there is known a device disclosed in Japanese Published Application No. Sho 56-34550. In this device, the braking action is maintained by containment of the brake fluid pressure when a clutch pedal is depressed to allow a clutch to be uncoupled, and the braking action is released when the clutch pedal is returned.

Accordingly, by using the prior art brake device stated above, the starting operation on an upward slope will be facilitated since a returning action of the clutch pedal is effected after the acceleration pedal is depressed to an optimum position.

On the contrary, in the other brake device in which the brake fluid is released only by depressing an acceleration pedal, this release operation occurs whenever the acceleration pedal is depressed until the same position. Accordingly, an engine torque in such case is always constant, resulting in that the engine torque is too small or too large with respect to a predetermined engine torque appropriate for the inclination of a upward slope.

As stated above, since the prior art brake device is designed so as to release the brake fluid in response to the returning operation of a clutch pedal, a starting operation during starting of a vehicle on an upward slope becomes easy. However, it is likely that the following inconvenience occurs during backward starting.

Namely, when a vehicle is stopped at a desired position by backwardly moving the vehicle, it is often executed by simultaneously depressing a brake pedal and the clutch pedal. In this condition in which the vehicle is placed in a decelerated condition, a valve, element such as a ball provided within a brake retainer valve tends to move in the backward direction of the vehicle toward a valve seat by its gravity. Accordingly, during the depressing of the brake pedal if the clutch pedal is depressed, a brake fluid appearing immediately or slightly before the clutch pedal is depressed is entrapped on a wheel cylinder of a brake actuating device. As a result, even if an attempt is made to return the brake pedal from a certain depressed position for reducing a braking force, the brake fluid is still trapped so that the braking action is maintained as it is. This causes the problem that a vehicle is unable to stop at a desired position.

SUMMARY OF THE INVENTION

An object of the present invention is to provide a brake device which allows a vehicle to be stopped at the desired position when the vehicle moves backwardly.

Another object of the present invention is to provide a brake device which prevents the vehicle from stopping against the will of the driver when the vehicle moves backwardly.

Other object of the present invention is to provide a brake device in which, when a vehicle starts on an upward slope, the braking power is maintained by containment of the brake fluid pressure, even after the brake pedal is returned from the depressed and a clutch pedal is still depressed. The starting operation is facilitated by releasing the braking power when the clutch pedal is returned at the time of starting.

Another object of the present invention is to provide a brake device which allows a concise construction for the device.

Briefly described, these and other objects of the present invention are accomplished by an improved brake device which includes a hydraulic circuit for supplying a fluid from a fluid source to a brake actuating device provided on the side of a wheel. The hydraulic circuit is provided with a brake retainer valve comprising a valve element provided within a valve chamber and to a valve seat on which the valve element is seatable, so that, after a brake pedal is depressed on an upward slope, the valve element is seated on the valve seat in response to the depressing of the clutch pedal independent of the returning action of the brake pedal to prevent a fluid from being released from the brake actuating device to the fluid source, and allow the valve element to be away from the valve seat in response to the returning of the clutch pedal, thus permitting the fluid to be released. Further, the brake retainer valve comprises a solenoid incorporated therein to prevent the valve element from being seated on the valve seat by attracting the valve element in cooperation with a device for detecting backward moving of the vehicle.

BRIEF DESCRIPTION OF THE DRAWING

These and other objects, features, and advantages of the present invention will be more apparent from the following description of a preferred embodiment, taken in conjunction with the accompanying drawings, in which.

DESCRIPTION OF THE PREFERRED EMBODIMENTS

Figure 1:
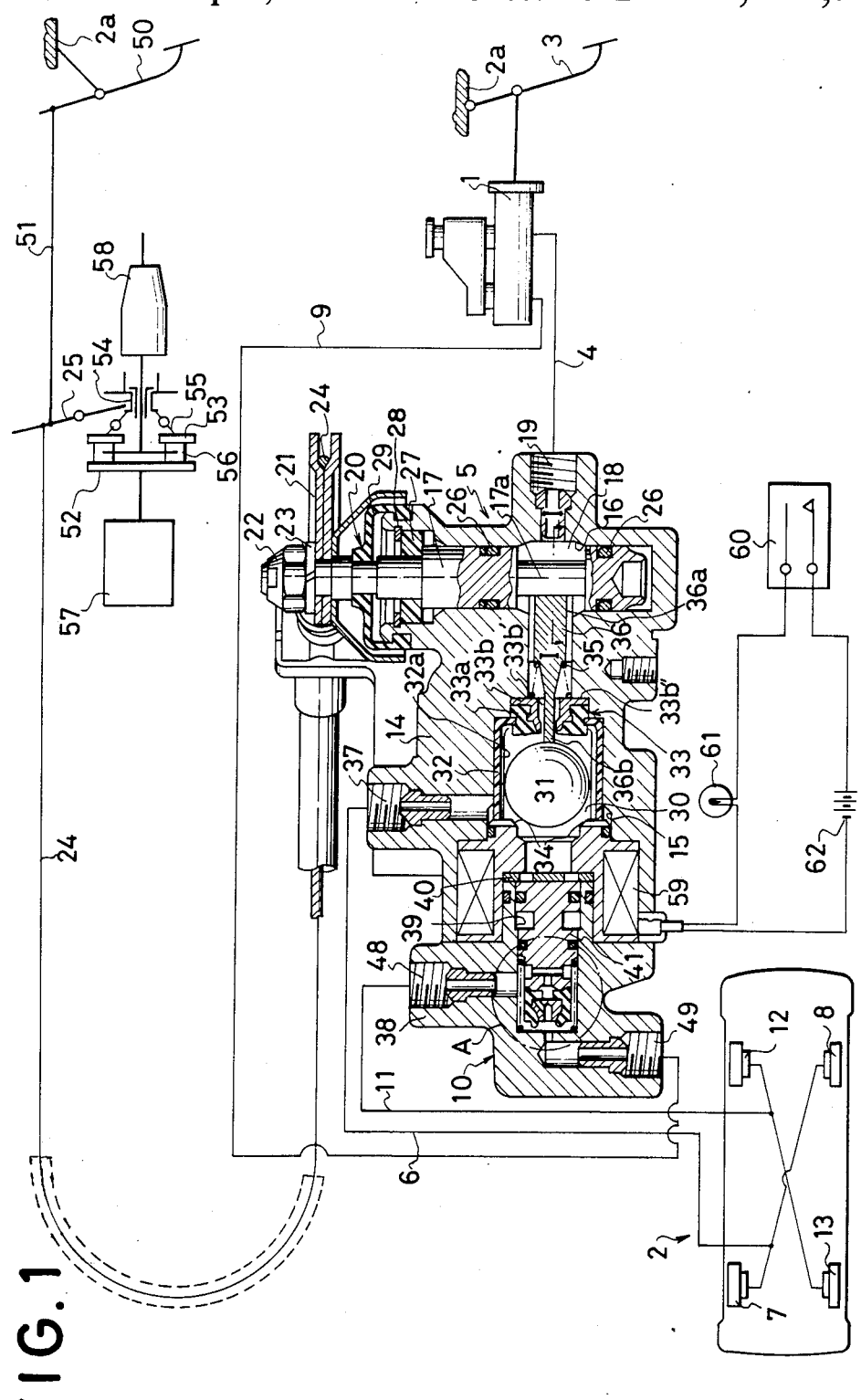
FIG. 1 is an overall construction diagram of a braking device embodying the present invention.

Referring now to FIG. 1, there is shown a fluid pressure brake device embodying the present invention. A tandem master cylinder 1 is installed to a inside front part 2a of a vehicle 2. The tandem master cylinder 1 is operated by a brake pedal 3 which is attached movably to the inside front part 2a of the vehicle 2. Two independent fluid pressure generating chambers are formed in the master cylinder 1. One of the fluid pressure generating chambers is in communication with the wheel cylinders of a brake actuating device 7 of a right front wheel and a brake actuating device 8 of a left rear wheel of the vehicle 2 through piping 4, a brake retainer valve 5, and a piping 6. The other fluid pressure generating chamber is in communication with a brake actuating device 12 on a right rear wheel and a brake actuating device 13 on a left front wheel of the vehicle 2 through a piping 9, a valve device 10, and a piping 11. The valve device 10 is attached to the brake retainer valve 5 as a single unit.

Figure 2:
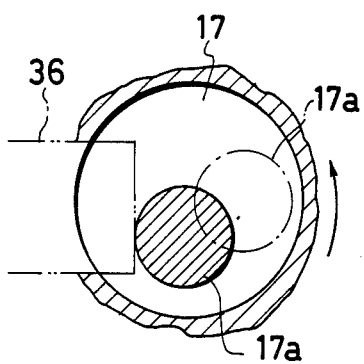
FIG. 2 is a cross section diagram along the line I—I in FIG. 1.

A stepped hole 15 and an unpierced hole 16 which is arranged perpendicularly to the stepped hole 15 are formed by drilling a main body 14 of the brake retainer valve 5. The diameter of the stepped hole 15 increases stepwise toward the front of the vehicle 2. In FIG. 2, the front direction of the vehicle 2 is toward the left of the figure.

In the unpierced hole 16, a cam axis 17 is inserted rotatably, and the cam axis 17 includes a cam 17a at a location opposing the open end of the stepped hole 15. The cam 17a has a reduced diameter and is eccentrically set relative to the cam axis 17. The cam chamber 18 containing the cam 17a is in communication with the piping 4 through joining hole 19. At the upper end of the cam axis 17, an installing section 20 projecting out from the unpierced hole 16 is formed. A roughly fan-shaped rotating member 21 is attached to the installation section 20 by a nut 22 and a washer 23. The rotating member 21 is connected to a wire 24 on one end and to a spring (not shown in the FIG. 2) on the other end to rotate together with the cam axis 17 against the restoring force of the spring corresponding to a movement of a clutch operating arm 25. Further, the cam axis 17 is provided with a seal member 26, a slide member 27, a stopper 28, and a water and dust tight boat 29.

A cylindrical ball guide member 32 is fixed to the large diameter section forming a valve chamber 30 of the stepped hole 15 for receiving an internally movably spherical valve element 31. On the inner surface of the ball guide member 32, numerous grooves 32a which run in the direction of the axis of the stepped hole 15 are formed. Further, a valve seat assembly 33 is embedded on one end of the stepped section of the ball to seat the valve element 31 thereon. The valve seat assembly 33 includes a seating unit 33a made of rubber and a supporting unit 33b which is united to the seating unit 33a. The valve seat assembly 33 is engaged into one unit with the ball guide 32 through the groove formed around the outer periphery of the seating unit 33a. A projection (not shown) is formed in circular form on the outer periphery of the seating unit 33a. Further, the supporting unit 33b has an inner hole 33b' and a plate section 33b''. In the small diameter section of the stepped hole 15, a plunger 36 is movably inserted and, a small spring 35 is inserted between the supporting unit 33b of the valve seating assembly 33 and the plunger 36, so that the right end of the plunger 36 is in direct contact with the cam 17a by the force of the spring 35. Moreover, the plunger 36 has around its outer periphery numerous grooves 36a running parallel to the axis direction. A small diameter section 36b is formed at left end of the plunger 36 so as to project into the valve chamber 30 through the valve seat assembly 33 to contact directly to the valve element 31. In addition, the valve chamber 30 is in communication with the piping 6 through the joining section 37 which is formed in the main body 14 of the brake retainer valve 5.

Figure 3:
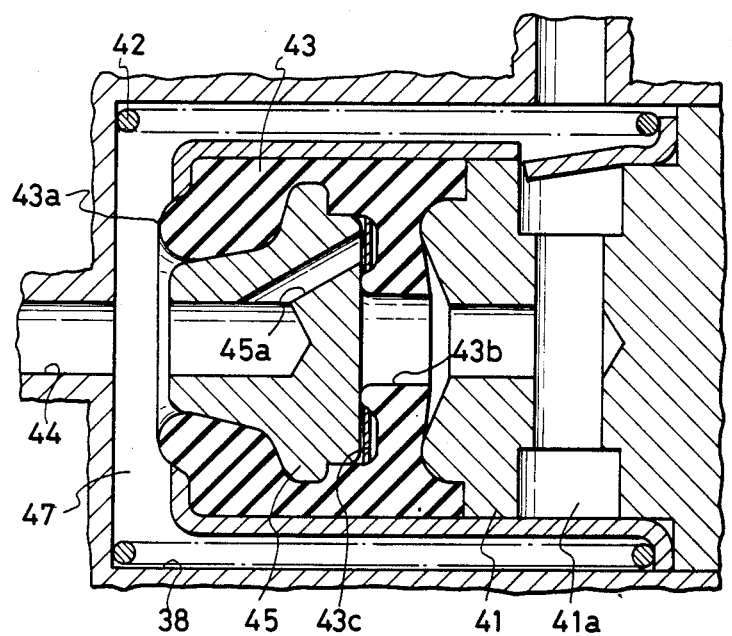
FIG. 3 is an enlarged cross section diagram of the area within the circular arrow A.

Next, a stepped hole 39 having a large diameter hole and a small diameter hole is formed in the main body 38 of the valve device 10 and an inserted plate 40 is placed between the large diameter hole and the valve chamber 30. In the stepped hole 39, a sliding piston 41 is inserted closely so that the pressure in the valve chamber 30 is exposed to the right end surface of the piston 41. Further, a spring 42 is inserted between the main body 38 of the valve 10 and the piston 41 with relatively small set load so as to push the piston 41 toward the valve chamber 30, as shown in FIG. 3. A small hole 41a is provided in the small diameter section of the piston 41. On the left end surface of the piston 41, a seal member 43 which comprises a lip 43a in the axial direction and an inner lip 43b is provided between the piston 41 and the main body of the valve 38. When the piston 41 moves to the left side, the lip 43a in the axial direction contacts with the main body 38 for closing the joining hole 44. Inside the seal member 43, there is provided an inserted unit 45 which has a passage way 45a that permits only the flow of the fluid from the master cylinder 1 through a valve chamber 47. The valve chamber 47 formed in the small diameter section of the piston 41 is in communication through the joining section 48, with the piping 11, and, further, the valve chamber 47 is in communication with the piping 9 through a joining section 49 which is in communication with the joining hole 44.

In addition, the clutch device shown schematically in the FIG. 1 comprises a clutch pedal 50, a clutch wire 51, a flying wheel 52, pressure plates 53, a release bearing 54, diaphragm springs 55, and clutch disks 56. The clutch device is also connected to an engine 57 and a transmission device 58.

Now, the mechanism which prevents the seating of the valve elements 31 on the valve seating unit 33a during the vehicle's backward movement is described hereinafter. A solenoid 59 is provided in the brake retainer valve 5, more particularly, between the main body 14 of the brake retainer valve 5 and the main body 38 of the valve 10. The valve element 31 is attracted toward a valve element receiver 34 by the magnetic force generated at the time that electric current is applied to the solenoid 59.

As the reverse driving detection means, a reverse warning switch 60 of the reverse lamp circuit is employed. The reverse warning lamp switch 60 is closes when the shift lever is set to the reverse. The reverse lamp circuit further includes a reverse lamp 61 and a power supply 62.

Therefore, when the operator of the vehicle depresses the brake pedal 3 while driving on an upward slope, the fluid is supplied to the pipings 4 and 9 from the master cylinder 1, and the brake function starts by supplying the pressure fluid to each brake actuating devices 7, 8, 12, 13 of the wheels. At this time, the pressure fluid from the master cylinder 1 is supplied to the brake actuating devices 7 and 8 through successively the piping 4, the cam chamber 18, the groove 36a on the plunger 36, the inner hole 33b' of the valve seat assembly 33, the valve chamber 30, and the piping 6, and is supplied to the brake actuating devices 12 and 13 through the piping 9, the valve chamber 47, and the piping 11.

Here, approximatly equal pressures are transmitted to the pipings 4 and 9. Therefore, the force which acts on the piston 41 to move it toward the left overcomes the sum of the force which pushes the piston 41 to the right and the force of the spring 42 based on the difference in the areas of the fluid pressure action on the piston 41. Therefore, the piston 41 pushes the sealing unit 43 until it makes a direct contact with the main body 38 of the valve 10. As a result, the joining hole 44 is closed by the lip 43a to stop the fluid flow from the piping 11 to the piping 9. Subsequently, the inner lip 43b undergoes an elastic deformation by the fluid pressures through the passage way 45a of the inserted unit 45, and the pressure fluid may be supplied from the piping 9 to the piping 11 through the gap created by the deformation.

Then, when the vehicle is stopped on an upward slope, and if the operator substantially depresses the clutch pedal while depressing on the brake pedal, the unconnected state of the clutch is performed. By so doing, the clutch operating arm 25 is moved, so that the rotating unit 21 on the brake retainer valve 5 starts to rotate. This causes the rotation of the cam 17a of the cam axis 17. Therefore, the plunger 36 moves then toward the right due to the force of the spring 35 until the valve element 31 seats itself on the valve seat assembly 33. The vehicle stops completely in this state, and upon removal of the operator's foot from the brake pedal 3, the fluid pressure in the the piping 4, is released, while the fluid pressure in the side of the piping 6 is maintained as is.

Moreover, in the valve device 10, the piston 41 stays as is at the position, because of the fluid pressure in piping 6, though the fluid pressure in the piping 9 was reduced. Also, the fluid pressure in the piping 11 is maintained as is because the fluid flow from the piping 11 to the piping 9 is prohibited.

In other words, since the fluid pressure in the wheel cylinder of each of the brake actuating devices 7, 8, 12, and 13 is maintained, a sufficient braking power required to keep the vehicle in the stopped condition on an upward slope can be secured by depressing the clutch pedal even without depressing the brake pedal. Moreover, when the acceleration pedal is depressed to start the forward motion of the vehicle on the upward slope, the braking power is released as soon as the foot on the clutch pedal is removed, thus allowing the vehicle to start moving.

Here, the stop operation of the vehicle at a desired position when the vehicle moves backward will be described. When the operator substantially completely depresses the clutch pedal 50 and sets the shift lever to reverse, the reverse driving warning lamp switch 60 of the reverse lamp circuit is closed and an electric current flows to the reverse lamp 61. At the same time, a current flows through the solenoid 59 to remove the valve element 31 from the valve seating unit 33a by its attracting power. By depressing the acceleration pedal and returning the clutch pedal 50, in this state, the vehicle 2 moves backward. When the vehicle approaches the desired stop position the vehicle speed is reduced gradually by depressing the brake pedal 3. At this time, the clutch pedal 50 is depressed until the vehicle completely stops. In reverse driving, the valve element 31 is removed from the seating unit 33a by the attracting force of the solenoid 59, so that the pipings 4 and 6 and the pipings 9 and 11, respectively are communication with each other through the brake retainer valve 5 and the valve device 10 without functioning to contain the brake fluid. As a result, the pressure supplied to the pipings 6 and 11 varies in accordance with the force of depressing the brake pedal 3. This permits the operator to stop the vehicle in backward driving at a desired position by adjusting the brake pedal 3. Furthermore, by switching the shift lever from the reverse to the forward, no current is supplied to the solenoid 59. Thus, it is possible to contain the brake fluid pressure in the manner as above.

Moreover, in this embodiment of the present invention, the solenoid 59 is arranged in the brake retainer valve 5 so that it is possible to remove the valve element 31 from the valve seating unit 33a by using the attracting force of the solenoid 59 directly without transforming the attracting force to some other things.

Furthermore, the reverse warning lamp circuit 60 of the vehicle 2 is used as a means of detecting the reverse driving so that an additional means of detecting the reverse driving is not required, resulting in the simple construction of the device.

Various modifications will become possible for those skilled in the art after receiving the teachings of the present disclosure without departing from the scope thereof.

What is claimed is:

1. A brake device which supplies and maintains the pressure fluid from a pressure source to a brake actuating device attached to a wheel of a vehicle by operation of a brake pedal and a clutch pedal, the clutch pedal being connected to a clutch device of the vehicle, said brake device comprising:

means, including a brake retainer valve comprising a valve body having a valve chamber, a valve element arranged in said valve chamber, and a valve seat on which the valve element is arranged to be seated and unseated, said brake retainer valve being connected to the pressure source, the brake actuating device, and the clutch device, for preventing the pressure fluid supplied to the brake actuating device from the pressure source from being released to the pressure source when the clutch device is uncoupled, and for releasing the pressure fluid supplied to the brake actuating device from the pressure source to the pressure source when the clutch device is coupled;

means for detecting that the vehicle is in reverse gear; and means, housed in said brake retainer valve on the side of said element opposite said valve seat and responsive to a positive indication of said detecting means that the vehicle is in reverse gear, for directly magnetically attracting said valve element from said valve seat to cause the brake actuating device to be operative in response only to the operation of the brake pedal through the brake retainer valve and the pressure source.

2. A brake device as claimed in claim 1, in which the pressure fluid is retained by the brake actuating device by seating the valve element on the valve seat when the clutch device is uncoupled on an upward slope, the pressure fluid is released from the brake actuating device to the pressure source by removal of the valve element from the valve seat when the clutch device is coupled.

3. A brake device as claimed in claim 2, in which said pressure fluid releasing means is constructed to prevent seating of the valve element on the valve seat according to the positive indication from the reverse gear detecting means.

4. A brake device as claimed in claim 3, in which said brake retainer valve further comprises a cam axis arranged in the valve body and having a cam with a reduced diameter and eccentrically set relative to the cam axis, and a plunger provided on the valve body to contact one end thereof with the cam and other end thereof with the valve element, the cam axis being connected to the clutch device in such a manner that the cam axis with the cam is rotated to move the plunger until the valve element seats on the valve seat at the uncoupled state of the clutch device.

5. A brake device as claimed in claim 2, in which said pressure fluid releasing means comprises a solenoid housed in the brake retainer valve for attracting the valve element to remove the valve element from the valve seat.

6. A brake device as claimed in claim 1, in which said reverse gear detecting means comprises a reverse warning switch of a reverse lamp circuit which is closed when the vehicle is in reverse gear.

7. A brake device as claimed in claim 1, in which the valve element is a ball member.

8. A brake device as claimed in claim 1, further comprising a valve device connected to the pressure source and the brake actuating device.

9. A brake device which supplies and maintains pressure fluid from a pressure source to a brake actuating device attached to a wheel of a vehicle, comprising:
   a brake pedal;
   a pressure source for supplying a pressure fluid responsive to said brake pedal;
   a brake retainer valve, which includes:
     a valve body,
     a valve chamber formed in said valve body and comprising a valve element and a valve seat for engagably seating said valve element,
     a cam chamber formed in said valve body substantially perpendicular to said valve chamber and operatively engaging said valve chamber, said cam chamber comprising a cam axis and a rotatable cam having a reduced diameter and being eccentrically set relative to said cam axis, and
   a plunger which extends between said valve chamber and said cam chamber substantially perpendicular to said cam axis, one end of said plunger contacting said valve element and the other end of said plunger contacting said cam, wherein said cam axis is drivenly connected to a clutch device to rotate said cam thereby moving said plunger until said valve element seats on said valve seat in the uncoupled state of the clutch device;
   circuit means for detecting that the vehicle is in reverse gear;
   a solenoid, housed in said brake retainer valve and connected to said circuit detecting means, said solenoid magnetically attracting said valve element in a direction opposite said valve seat when the circuit means detects that the vehicle is in reverse gear;
   a valve device operatively connected to said pressure source and said brake retainer valve, said valve device comprising a main body adjacent and extending parallel to said valve body, a piston housed in said main body, a seal member attached to an end of said piston opposite said valve body, and a joining orifice opening into said main body at an end of the main body opposite said valve body, wherein when said valve element is seated on said valve seat, said pressure fluid positions said piston in said main body to engage said seal member and said joining orifice; and
   four brake actuating devices, each of said devices being connected to a respective wheel of the vehicle, wherein two of said brake actuating devices are operatively connected to said pressure source through said brake retainer valve and the other two of said brake actuating devices are operatively connected to said pressure source through said valve device.

10. A brake device as claimed in claim 9, wherein said seal member comprises an insert unit which includes a passageway, said passageway providing for flow only in the direction away from said pressure source.

* * * * *